Figures 1, 2:
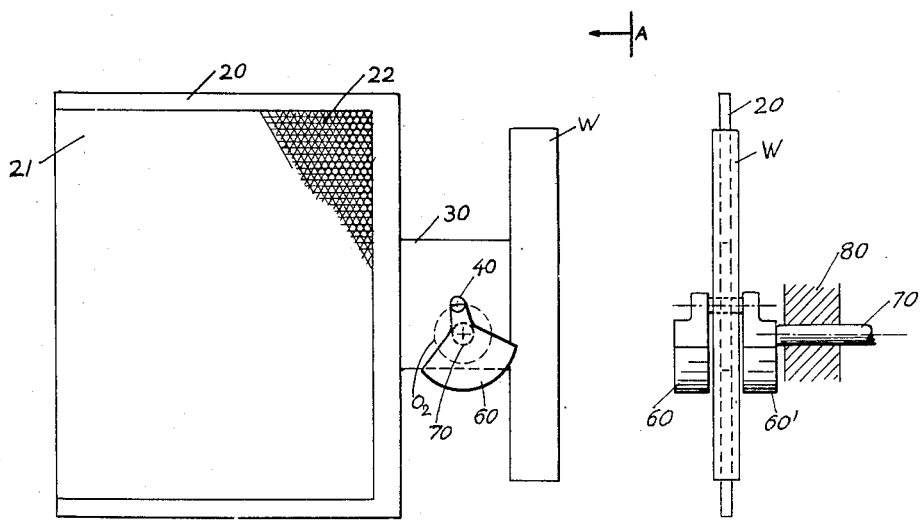

June 3, 1958 R. T. ERBAN 2,837,008
KINOPTIC DEVICES
Original Filed March 10, 1952

VIEW A A

Richard Erban
INVENTOR.

BY

United States Patent Office 2,837,008
Patented June 3, 1958

2,837,008

KINOPTIC DEVICES

Richard T. Erban, Flushing, N. Y.

Original application March 10, 1952, Serial No. 275,760, now Patent No. 2,780,136, dated February 5, 1957. Divided and this application June 8, 1956, Serial No. 590,122

4 Claims. (Cl. 88—28.93)

This invention relates to optical devices and is a continuation of my copending application Ser. No. 275,760, now Patent 2,780,136, issued February 5, 1957.

More particularly, it relates to an improvement in projection screens of the kind which have an orbital motion of relatively high frequency and which have been termed kinoptic devices as explained in the above identified copending application.

In the course of building and experimenting with such screens, I have found that considerable difficulties may arise with structures in which orbital motion is transmitted to the screen at several points thereof. For example, where the orbital motion is transmitted to the screen by two cranks, it is found that even very minute errors in synchronization of the two cranks, both with respect to speed and phase, can cause unwanted vibrations of the screen, which may also be transverse with respect to the screen. Such vibrations adversely affect the optical resolving power of the screen to a point where it may become useless.

While it may appear at first glance that these difficulties can be avoided by suspending the screen from a single crank, experiments soon show that this structure is inoperative at the frequencies required for kinoptic devices: Almost the entire surface of the screen does not follow the orbit path but follows a pattern of substantially linear oscillations. Such linear oscillations have been found to be completely useless for obtaining the intended objective.

According to this invention, a substantially identical path of orbital motion for all points of the screen surface is obtained by the combination with the screen of an inertia mass spaced from the screen while connected thereto so as to move in unison therewith and of a means imparting orbital motion to a single point positioned substantially between said screen and said inertia mass.

This structure is illustrated by way of example in Figs. 1 and 2 of the accompanying drawings. Fig. 1 which shows an elevated view of the structure is identical in all respects (except scale) with the disclosures in Fig. 6 of my copending application Ser. No. 275,760, Fig. 2, showing a side view of the structure of Fig. 1, is identical in all respects (except scale) with the disclosures of Fig. 7 of the before mentioned copending application.

Inspection of the drawings will show that the frame 20 holds a screen 21 which has a surface composed by a multitude of elements 22 of a kind that cause deflection or scattering of the light rays impinging upon the screen. A primary inertia mass W is positioned spaced from the frame 20 and screen 21, and is connected thereto by the member 30. Substantially in the middle of the member 30 is placed a journal connecting it to the crank pin 40. The moment of the mass W with respect to the center of pin 40 is made substantially equal to the moment of the frame 20 plus screen 21 with respect to the same point, or center of 40. The crankpin 40 in turn is carried by the shaft 70 rotating in the bearing 80. The radius of the crank pin 40 with respect to the shaft 70 determines the orbital path $O_2$, shown in dotted line. The orbital path followed by each point of the screen 21 is identical in size and form to this orbital path $O_2$.

Two balancing masses 90—90' are provided on both sides of the member 30 and they are in angular position of 180° opposition with respect to the crank pin 40. The masses are shown substantially equal in size and positioned substantially symmetrical with respect to the plane of the screen 21 and frame 20, so that the center of gravity common to both masses 90—90' will be substantially in the same plane with the center of gravity of the parts 20—21—30—W. The masses 90—90' are furthermore so arranged that their moment with respect to the center line of shaft 70 is substantially equal to the moment of the combined parts 20—21—30—W with respect to the same center line of shaft 70.

The structure according to this invention discloses therefore two kinds of inertia masses (primary masses W and secondary masses 90—90') and two distinct centers with respect to which the masses must be balanced or their moments equalized. This structure permits to eliminate all free inertia forces in the orbital system even while operating at the higher frequencies required.

The term "orbital motion" in this specification and in the claims is used to denote the specific kind of screen motion produced by the device herein disclosed, and to distinguish this kind of screen motion from other kinds of motion, which may be understood to come under the broad term of orbital motion, but which are wholly unsuited and inoperative to obtain the object of this invention. The specific kind of motion produced by the device here disclosed is characterised by the following facts: First, each and every point of the screen surface follows a path substantially identical to that of all other points; second, this path is a closed curve, in the device disclosed in the drawings substantially a circle; this means that the speed of each point (i. e. the speed vector) changes its direction continuously while the speed of each point remains always positive; third, at any given instant all points move in substantially the same direction and all change their direction of motion simultaneously, or in synchronism with each other.

While I have described a specific form of embodiment of my invention, it is understood that this is done by way of example and that various other forms exist in which my invention may be carried out without departing from its basic structure; and all such variations and modifications shall be understood to come within the scope of my invention which shall be limited only as defined by the following claims.

What I claim is:

1. In a device of the class described, in combination, a screen, a primary inertia mass positioned outside said screen to one side thereof and connected thereto so as to move in unison therewith, a journal positioned intermediate said screen and said primary mass, the mass of said screen and of said primary mass respectively, and their distances from said journal being so arranged that their common center of gravity will be positioned substantially near said journal, and means for imparting to said journal a continuous motion along a closed path.

2. In combination, a screen mounted for free orbital motion in its own plane, a primary inertia mass connected to said screen substantially to one side thereof, a journal positioned intermediate said screen and said primary mass substantially near the common center of gravity of said screen and said primary mass respectively, means for imparting to said journal a motion of continuous speed along a curved path which returns into itself, and secondary inertia masses adapted to balance the orbital motion of said screen and said primary mass, 3. In an optical device of the class described, a screen, means for generating an orbital motion along a curved path returning into itself and co-planar with the surface of said screen, said means being connected to said screen at a point outside said surface, and a mass solidly fastened to said screen and extending therefrom beyond said point outside said surface whereby said point will locate near the center of gravity of said screen.

4. In combination with a movable screen, means supporting said screen for free orbital motion in its own plane, a mass fixedly connected to said screen in such manner that the common center of gravity of said screen and of said mass is positioned substantially near the edge of said screen, means for imparting orbital motion to said screen and said mass, said last named means being connected to said screen at a point positioned near said common center of gravity, and balancing masses arranged on both sides of the plane of said screen.

References Cited in the file of this patent

UNITED STATES PATENTS

| | | |
|---|---|---|
| 778,542 | Krebs | Dec. 27, 1904 |
| 2,139,855 | Genies | Dec. 13, 1938 |

FOREIGN PATENTS

| | | |
|---|---|---|
| 448,889 | Great Britain | June 17, 1936 |
| 592,815 | Great Britain | Sept. 30, 1947 |